March 6, 1934. F. P. MILLER 1,949,872
BORING TOOL
Filed July 14, 1931 3 Sheets-Sheet 1
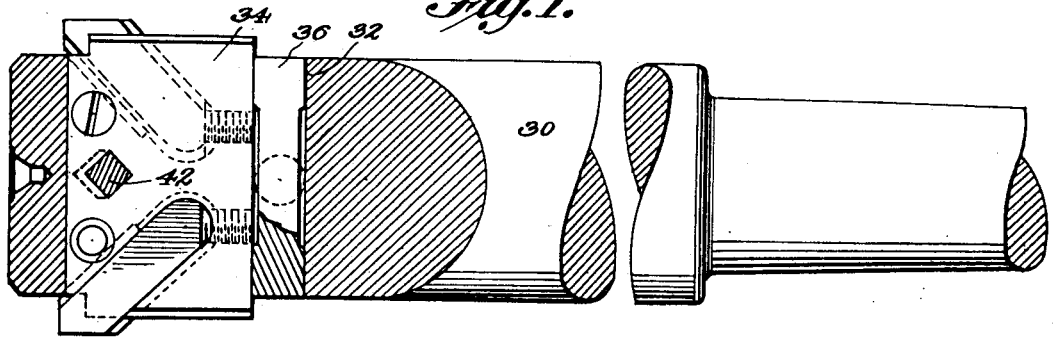
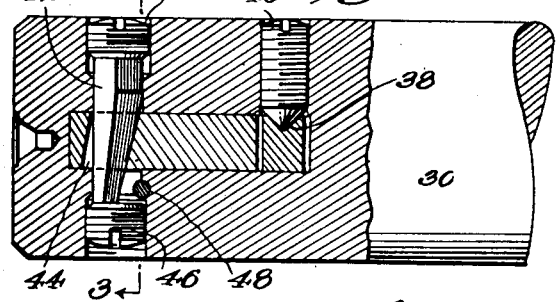
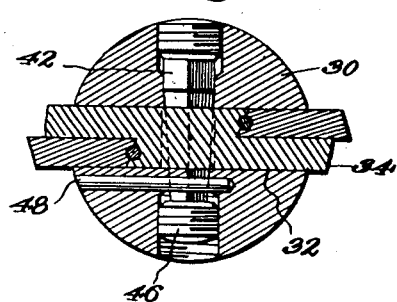
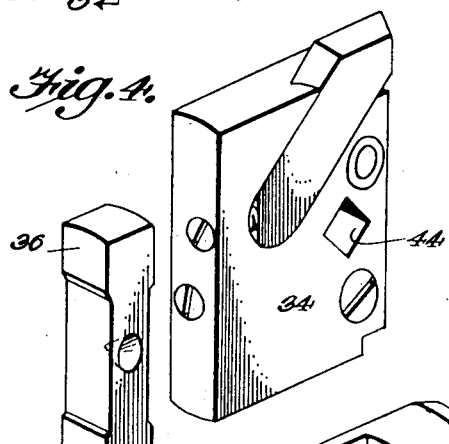
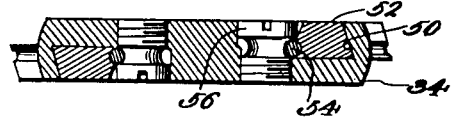
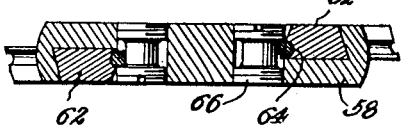
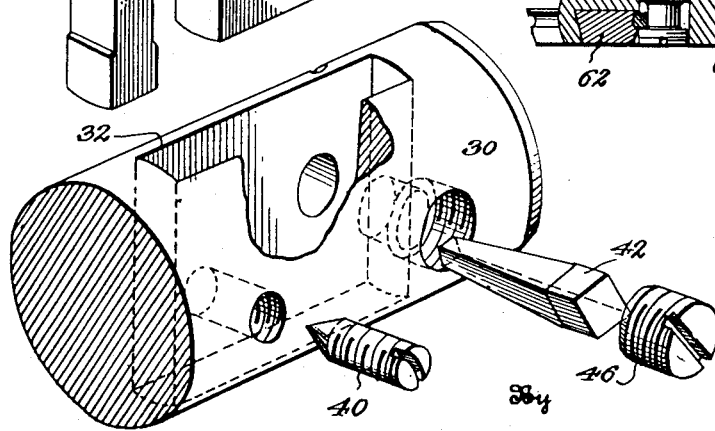
Inventor
FRANK P. MILLER

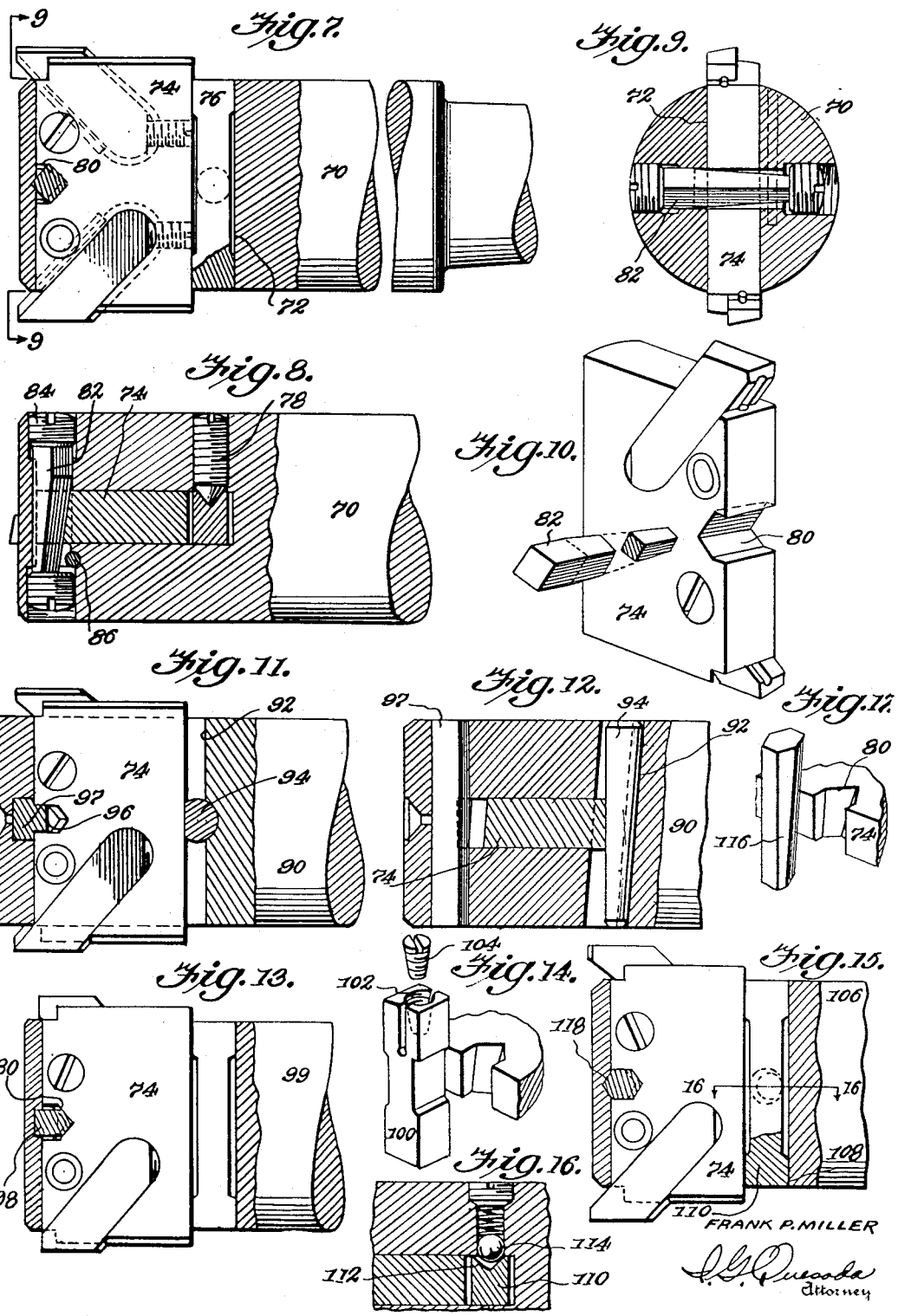

March 6, 1934.  F. P. MILLER  1,949,872
BORING TOOL
Filed July 14, 1931  3 Sheets-Sheet 3
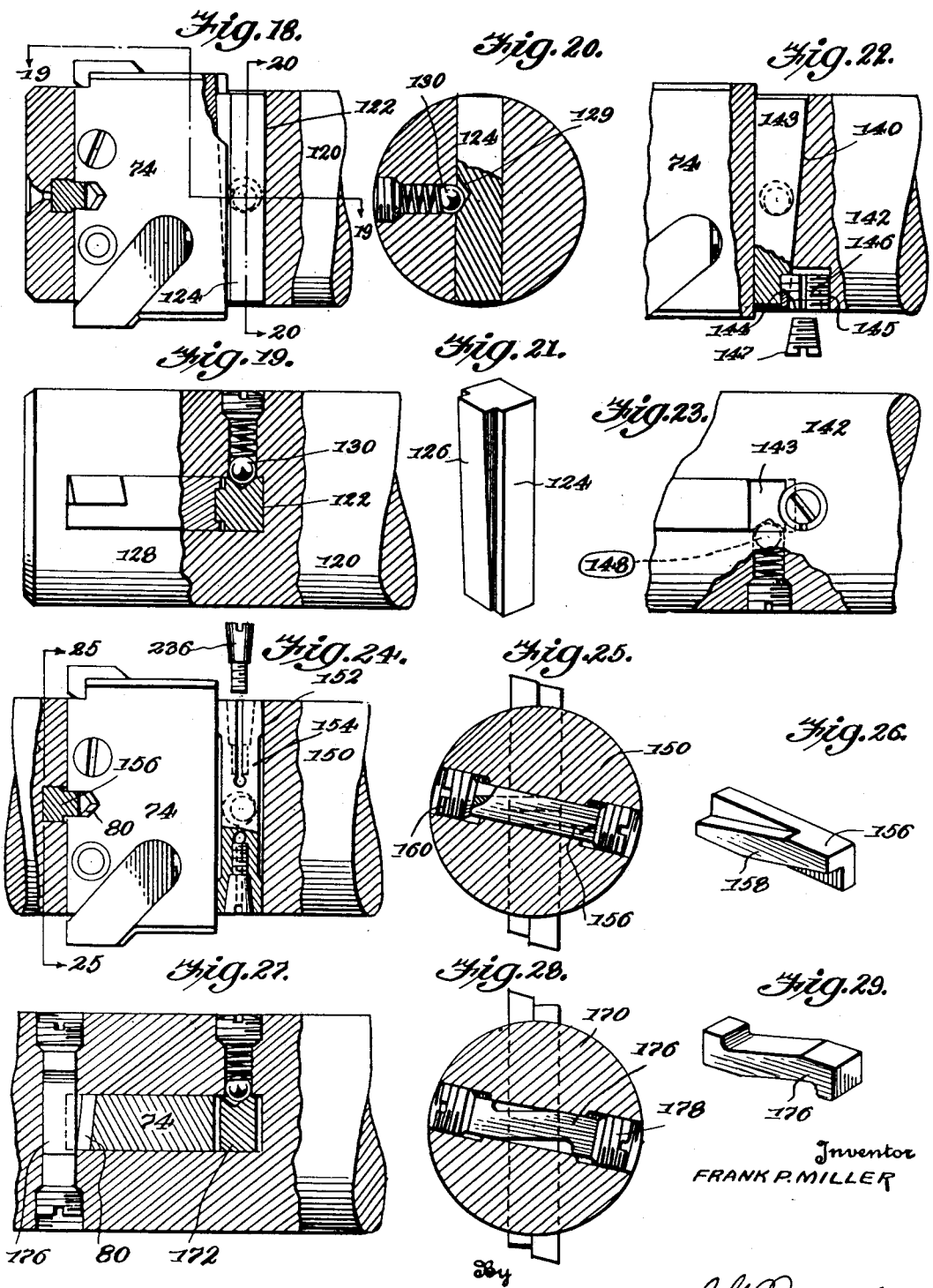
Inventor
FRANK P. MILLER Patented Mar. 6, 1934

1,949,872

UNITED STATES PATENT OFFICE 1,949,872

BORING TOOL

Frank P. Miller, Meadville, Pa.

Application July 14, 1931, Serial No. 550,769

17 Claims. (Cl. 77—56)

This invention relates to rotary cutters especially adapted for use in metal working.

The invention contemplates among other things, a rotary cutter in which the cutting unit thereof may be either held rigidly in place or allowed to float to the desired extent to follow the hole being worked, the arrangement being such that it is a simple matter to compensate for misalignment of the bar due to warpage or other distortion and thereby cause the cutting elements to move in the same circular path.

Under certain conditions, it is advantageous to cause the cutting elements of a cutter block to extend forwardly beyond the block receiving opening through the boring bar or other support and with an appreciation of this, a rotary cutter constructed in accordance with this invention will be found to have this advantage and the added advantage of quick removability of the cutter block without the necessity of first retracting the blades and destroying the adjustment thereof, in consequence of which it is possible to remove the block and to re-apply the same without the need of readjusting the blades to the desired cutting diameter, attention in this latter connection being invited to the fact that the thrust member by which the cutter block and the blades thereof are held in the positions described, is preferably of tool steel or some other material having a hardness superior to that of the boring bar so that the same by occupancy of a position between the rear edge of the cutter block and the rear wall of the block receiving opening will protect against mutilation the rear wall of the block receiving opening.

A rotary cutter having the foregoing advantages is of highly simplified construction, rugged in use, comparatively cheap to manufacture and the arrangement of the various parts is such that replacement, when necessary, is made easy.

Other objects and advantages will be apparent during the course of the following description.

In the accompanying drawings, forming a part of this application and in which like numerals are employed to designate like parts throughout the same, Figure 1 is a fragmentary side elevation of a rotary cutter embodied in the invention, parts being shown in section, Figure 2 is a detail longitudinal sectional view through the forward portion of the improved rotary cutter, the view being taken at right angles to Figure 1, Figure 3 is a transverse sectional view through the cutter, the view being taken on line 3—3 of Figure 2.

Figure 4 is a group perspective illustrating the cutter block and associated parts, the supporting member for the cutter block being shown partly in section, Figure 5 is a detail sectional view through the cutter block illustrating a novel blade holding arrangement, Figure 6 is a detail sectional view through the block, the view illustrating a modified form of blade holding means, Figure 7 is a fragmentary side elevation of a rotary cutter embodying a slight modification of the invention, parts being shown in section, Figure 8 is a detail longitudinal sectional view through a rotary cutter constructed along the lines disclosed in Figure 7, the view being taken at right angles to the showing in Figure 7, Figure 9 is a transverse sectional view taken on line 9—9 of Figure 7, Figure 10 is a perspective of the cutter block and locating pin therefor embodied in the form of invention shown in Figures 7, 8 and 9, Figure 11 is a detail longitudinal sectional view illustrating a further modification of the invention, Figure 12 is a detail longitudinal sectional view taken at right angles to the showing in Figure 11, Figure 13 is a detail longitudinal sectional view illustrating another form of the invention, Figure 14 is a group perspective disclosing a modified form of locating pin, Figure 15 is a detail longitudinal sectional view through a rotary cutter embodying another expression of the invention, Figure 16 is a detail longitudinal sectional view taken on line 16—16 of Figure 15, Figure 17 is a fragmentary group perspective of the locating pin and block disclosed in Figure 15, Figure 18 is a detail longitudinal sectional view through the forward portion of another form of rotary cutter embodying the invention, Figure 19 is a longitudinal view partly in section and partly in elevation taken on line 19—19 of Figure 18, Figure 20 is a transverse sectional view taken on line 20—20 of Figure 18, Figure 21 is a perspective of the thrust member shown in Figures 18, 19 and 20, Figure 22 is a fragmentary side elevation illustrating a slight modification of the invention, parts being broken away, Figure 23 is a fragmentary side elevation taken at right angles to Figure 22, a portion of the bar being in section, Figure 24 is a detail longitudinal sectional view disclosing a modified form of locating pin by which adjustment thereof brings about fine and accurate adjustment of the associated cutter block to compensate for inaccuracies in workmanship or distortion of the bar, Figure 25 is a transverse sectional view taken on line 25—25 of Figure 24 the view illustrating in dotted lines, the angularly extending block engaging rib by which endwise adjustment of the locating pin brings about a much reduced movement of the associated cutter block, Figure 26 is a perspective of the locating pin shown in Figures 24 and 25, Figure 27 is a fragmentary longitudinal sectional view through a rotary cutter having another form of locating pin, Figure 28 is a vertical transverse sectional view through the rotary cutter shown in Figure 27, and illustrating in side elevation the locating pin shown therein, Figure 29 is a perspective of the locating pin disclosed in Figures 27 and 28.

In the drawings, and particularly Figures 1–4 thereof, the numeral 30 designates a rotatable bar having a diametrical slot 32 opening out through opposite sides thereof for the snug reception of a cutter block 34 and a thrust receiving member 36. The thrust receiving member 36 is positioned closely between the rear wall of the cutter block and the rear wall of the slot 32 and as shown in Figure 2, is provided in one side thereof with a tapered or conical recess 38 receiving the pointed forward end of a retaining screw 40, the retaining screw being threaded into one side of the bar at right angles to the thrust member.

The presence of the thrust member 36 maintains the cutter block 34 in the forward portion of the diametrical slot 32 with the blades of such cutter block projecting beyond the forward wall of the slot as is sometimes preferred or required. When it is desired to remove the cutter block 34, for any one of a number of reasons, it is simply necessary to back up on the set screw 40 to allow of the endwise removal of the thrust member 36 and the subsequent retraction and radial removal of the cutter block 34, all without disturbing the adjustment of the blades of the cutter block. Of course, the thickness of the thrust member 36 is greater than the protrusion of the blades beyond the forward end of the slot 32 so that when the cutter block is retracted, the blades thereof will clear the forward wall of the slot.

In carrying out the invention the thrust receiving member may be of tool steel or some other material having a hardness superior to that of the material forming the bar 30 with the result that the member 36 will take the cutting thrust of the block 34 and thereby protect the rear wall of the slot 32 against the partial mutilation or distortion that would come about through direct pressure contact of the cutter block therewith.

As shown in Figures 1 and 2, a locating pin 42 is extended through the bar and through a rectangular opening or slot 44 in the block, the rectangular opening 44 being extended at an acute angle to the plane of the block and to the axis of the bar and having opposite corners thereof intersected by the longitudinal center of the cutter block and the axis of the bar.

The locating pin 42 which is rectangular in cross-section, is positioned to dispose the block contact faces thereof in opposed relation to the active faces or surfaces of the opening 44. More particularly, the rear portion of the locating pin 42 is closely embraced by the bar 30 so that the block contacting faces of the pin are held in opposed operative parallel relation to the complemental rear walls or faces of the opening 44. To bring about this relation of the locating pin and the cutter block, the block contact faces or surfaces of the locating pin 42 are inclined to correspond to the inclination of the opposed surfaces or faces of the rectangular opening 44 causing the pin to taper toward one end thereof.

The locating pin 42 is engaged at the ends thereof by set screws 46 threaded into the counterbored end portions of the transverse opening within which the locating pin 42 is positioned. Clearly, with the locating pin 42 and the set screws 46 adjusted as shown in Figure 2, the cutter block 34 will be locked rigidly in place, this being true because of the firm and uniform pressure contact between the complemental faces of the locating pin 42 and the transverse opening 44.

Should it be desired to allow a limited amount of float on the part of the cutter block 34 it is simply necessary to retract the locating pin 42 through proper adjustment of the associated set screws 46 whereupon the previously described uniform pressure contact between the complemental faces of the locating pin 42 and the opening 44 is broken.

The retraction of the locating pin 42 within its range of adjustability will permit the desired freedom of limited movement on the part of the cutter block 34 but the active faces of the locating pin 42 will remain in restraining, though slightly spaced relation to the opposed faces of the opening 44 thereby controlling the amount of float allowed the cutter block 34.

Returning now to the means by which the cutter block is held rigidly in place and is centered with respect to the work being done, attention is invited to the fact that should warping or other distortion of the bar be detected it is a simple matter to compensate for this irregularity by grinding one of the active faces of the locating pin 42 thereby causing the cutter block to occupy a a position slightly off center with respect to the axis of the bar. Of course, in grinding one of the active faces of the locating pin 42, care should be taken to maintain this active face at right angles to the other active face of the locating pin so that both of such active faces will be in position for flat and uniform pressure contact with the opposed and complemental walls of the opening 44.

When once the original symmetrical form of the locating pin has been destroyed by the grinding process necessary to compensate for distortion of the bar, it is necessary always to introduce the locking pin 44 into the bar from the same side of the bar and in this manner maintain the required special relation between the pin and the block.

To insure against the introduction of the tapered locating pin 42 from the wrong side, one end portion of the transverse opening that receives the locating pin may be slightly obstructed through the medium of a stop pin 48 or the like. Figure 1 illustrates that the stop pin 48 is positioned to intersect the wall of the opening in which the locating pin operates and in this manner the accidental insertion of the locating pin from the wrong side of the bar is prevented.

The cutter block is detailed in Figure 5 and is formed in opposite sides thereof with diagonal dove-tail grooves 50 receiving dove-tail blades 52. One side of each blade 52 is longitudinally grooved for the partial reception of a binding pin 54. The binding pin 54 is engaged by the annularly recessed intermediate portion of the set screw and is overhung and is engaged by the head of the set screw so that advancement of the set screw will bring about the secure binding engagement of the pin 54 with the blade 52.

In the form of invention illustrated in Figure 6, the block is designated by the numeral 58 and is provided in opposite sides thereof with dovetail grooves receiving similarly shaped blades 62, one edge of each blade being grooved for the partial reception of a binding pin 64. Each pin 64 is shown to be engaged and urged laterally into pressure contact with the associated blade 62 by a set screw 66, the latter being provided with threaded end portions having threaded engagement with the wall of the opening in which the screw is received. The intermediate portion of each set screw 66 is plain and diametrically reduced causing the threaded head of the screw to overhang and have pressure contact with the locking pin 62.

The details of construction illustrated in Figures 5 and 6 have been found to provide for the secure locking of the blades in place so that the blades are positively held against shifting during use. Also, the arrangements shown in Figures 5 and 6 are economical to manufacture and are simple to adjust. Since the opposite end portions of the set screws 56 and 66 are closely surrounded by the walls of the openings in which the same are positioned, the set screws are enabled to exert an effective lateral binding pressure against the associated pins thereby causing the blades to remain securely in place against the strain incident to use.

Referring now to the form of invention shown in Figures 7, 8, 9 and 10, the bar is designated therein by the numeral 70 and such bar is provided with a diametrical opening 72 receiving the cutter block 74 and a thrust member 76, the thrust member being held between the rear edge of the cutting block and the rear wall of the slot 72 by a set screw 78. Figure 8 illustrates that the set screw 78 is threaded into one side of the bar 70 and has the forward end thereof tapered to a point for reception in a conical recess in one side of the thrust member 76.

Referring now to Figure 10, it will be seen that the forward edge portion of the block 74 is provided with a V-shaped groove 80 having diverging walls, the outer portions of which are parallel. The V-shaped groove 80 is adapted for the partial reception of a locating pin 82 not unlike the pin 42 and the opposed walls of the groove 80 and the locating pin 82 are inclined at an acute angle to the plane of the block and to the axis of the bar so that retraction of the locating pin through adjustment of the associated set screws 84 allows a limited amount of float on the part of the cutter block 74. It is illustrated in Figure 8 that the inclination of the active or block-engaging faces of the pin 82 causes the pin to taper toward one end thereof in consequence of which, limited retraction of the pin will allow a limited freedom of movement on the part of the cutter block. Since the groove 80 opens out through one edge of the block, it is not necessary to remove the locating pin 82 as a preliminary to the removal of the cutter block.

Of course, the previous removal of the thrust member 76 allows of the retraction and subsequent radial removal of the cutter block 74 without disturbing the adjustment of the blades thereof, this being true although the blades were extended beyond the forward end wall of the slot 72. As in the case of the form of invention illustrated in Figures 1-4 inclusive, the thrust member 76 may be of tool steel or other material having a hardness greater than that of the material forming the bar 70 so that the rear wall of the slot 72 will be protected against destructive contact by the block 74.

The form of invention shown in Figures 7, 8, 9 and 10 might be said to differ over what is shown in Figures 1-4 inclusive in the extension of the pin receiving opening or groove out through one edge of the block to allow the locating pin to be backed and braced for practically the full length thereof by the bar and at the same time to permit the removal of the cutter block without first removing the locating pin, this being in contrast to the arrangement shown in Figures 1-4 inclusive, which requires that the locating pin 42 be removed as a preliminary to the detachment of the cutter block and which provides for only a limited bracing of the locating pin by the material forming the bar.

Like in the form of invention illustrated in Figures 1-4 inclusive, the locating pin 82 may be ground away on one of the active faces thereof to compensate for limited distortion of the bar or for imperfections in workmanship. Of course, the accurate grinding of the locating pin is necessary to provide for the exact correction of an irregularity in the bar.

When once the locating pin 82 has been ground for the purpose of correcting an irregularity in the bar, it is necessary that the subsequent introduction of the pin into the bar be from the same side of the bar and to assure this, one end portion of the opening which receives the locating pin 82 will be found to be slightly obstructed by the transverse pin 86. The presence of the obstruction 86, of whatever nature it happens to be, allows of the application of the locating pin from only one side of the bar and in this manner the required special relation between the locating pin and the associated cutter block is preserved.

In the form of invention illustrated in Figures 11 and 12, the bar 90 is provided with one or more transverse slots 92 for the reception of one or more cutter blocks 74. In this case, the block is held in the forward portion of the slot 92 by a more or less conventional taper pin 94 shown to be extended at right angles to the plane of the block 74 and having one side thereof flattened for pressure contact with the rear edge of the cutter block. The taper pin 94 is quickly releasable to facilitate the removal and installation of the associated block. This arrangement is especially advantageous when a number of cutter blocks are mounted on the bar for such successive operations as roughing, semi-finishing and finishing.

The parallel sides of the groove 80 in the forward edge portion of the block 74 are adapted for flat pressure contact by the sides of a central rib 96 of a rectangular locating pin 97. In the case of a perfectly straight bar, the block-engaging rib 96 is, of course, located centrally with respect to the locating pin 97 and the axis of the bar, and should misalignment of the bar be detected the locating pin 97 is substituted by another, in which the rib 96 is ground or otherwise formed slightly off center, thereby compensating for the lack of trueness in the bar.

In the form of invention illustrated in Figure 13, the diverging walls of the V-shaped groove 80 are engaged by the V-shaped edge portion of the locating pin 98. The locating pin 98 is of a width to fit freely within the groove 80 and the active faces of the V-shaped edge portion thereof may be selectively ground to compensate for such misalignment as is found in the bar. The locating pin 98 may be backed for the full length thereof by the material forming the bar 99, within which latter member, the block 74 is located.

In the form of invention illustrated in Figure 14, the locating pin 100 is of rectangular form in cross-section and is reduced in width between the ends thereof to define contact walls for the parallel outer walls of the groove 80. Should misalignment of the bar be detected, it is a simple matter to compensate for this by the employment of a new locating pin 100 having the intermediate portion thereof ground slightly off center thereby causing the block to occupy a position slightly off center with respect to the true axis of the bar.

The locating pin 100 shown in Figure 14 may be provided at one end thereof with a tapered socket 102 threaded for the reception of a tapered screw 104. The locating pin 100 is provided with a transverse slot intersecting the socket 102 and opening out through one end of the pin so that the advancement of the screw will bring about the expansion of the adjacent portions of the pin 100 into effective binding contact with the adjacent portion of the bar so to the end that the locating pin is held securely in place.

Referring now to the form of invention illustrated in Figures 15, 16 and 17, the bar 106 is provided with a transverse slot 108 opening out through opposite sides thereof and snugly receiving the block 74 and a thrust member 110. Figure 16 illustrates that the thrust member 110 is reduced in thickness between the ends thereof and is formed in one side thereof with a conical recess 112 partially receiving a spring pressed ball or detent 114. The ball 114 has pressure contact with what might be said to be the rear wall of the recess 112 so that the spring pressure on the ball is caused to urge the thrust member 110 against the rear wall of the slot 108 and in this manner there is taken up lost motion.

As shown in Figures 15 and 17, the longitudinal edge portions of the locating pin 116 are of V-shaped form to define faces complemental to and adapted for flat pressure contact with the diverging walls of the groove 80 and for snug reception within the V-shaped groove 118 of the bar 106. It is important to observe that the diverging walls of the groove 80 and the opposed walls or faces of the locating pin 116 are extended at an acute angle to the plane of the associated cutter and to the axis of the bar. Like in the other forms of invention, distortion of the bar 106 may be corrected by grinding away one of the block contact faces of the locating pin.

In the form of invention illustrated in Figures 18, 19, 20 and 21, the bar 120 or other support for the cutter is provided with a transverse slot 122 in which there is positioned the cutter block 74 and a thrust-receiving member 124. As shown in Figures 18 and 21, the thrust-receiving member 124 is provided on the cutter block side thereof with a rib 126 diminishing in cross-sectional area toward one end thereof to form a wedge adapted to be received in a groove 128 in the opposed wall of the block.

Advancement of the thrust-receiving member 124 will secure the cutter block 74 in position in the bar 124. The thrust-receiving member 124 is shown in Figure 20 to be provided in one side thereof with a conical recess 129 partially receiving a spring pressed ball 130. The ball 130 is not centered in the recess 129 but has pressure engagement with only one side thereof and specifically with what might be said to be the lower side thereof, thereby constantly urging the thrust member to the advanced position shown in Figure 18 and taking up the looseness that might otherwise be present. However, the ball and socket connection by which the thrust member 124 is urged to fully advanced position allows of the ready removal of the thrust receiving member.

In the form of invention illustrated in Figures 22 and 23 the rear wall 140 in the transverse slot through the bar 142 may be extended at an acute angle to the longitudinal axis of the bar 142 adapting the slot in the bar for the reception of a tapered thrust member 143.

As shown in Figure 22, the reduced end portion of the tapered thrust member 143 and the opposed wall of the slot 140 are provided with complemental notches 144 and 145 respectively cooperating in the formation of a socket for the reception of an annular stop element 146. More specifically, the notch 144 in the tapered thrust member 143 defines a shoulder in opposed relation to the inner end of the stop element 146 so that the advancement of the tapered thrust member is limited by the position of the stop element 146. The annular stop element 146 is shown to be threaded into the notch 145 so that slight retraction of the stop element will allow increased advancement of the tapered thrust member 143. On the other hand advancement of the stop element 146 will reduce the amount of forward movement allowed the tapered thrust member.

Thus, limited retraction of the stop element 146 allows advancement of the member 143 into firm wedging contact with the block 74 while advancement of the stop element 145 holds the tapered thrust element 143 in a more or less retracted position to the end that the desired amount of float on the part of the block 74 is permitted.

The annular stop element 146 is longitudinally split for the full length thereof and is internally threaded for engagement by a tapered pin 147 constituting a means by which the stop element may be expanded radially and thus held in the desired position in the bar.

The thrust member 143 may be provided in one side thereof with a conical socket receiving a spring pressed ball 148 corresponding in arrangement and function to the spring pressed ball 130 so that the thrust member is constantly urged to advanced position while at the same time the removal of the thrust member with facility is allowed.

In the expression of the invention illustrated in Figures 24, 25 and 26, the bar 150 is provided with a transverse slot 152, receiving the block 74 and a thrust member 154. In this form of invention, the locating pin 156 is extended at right angles to the axis of the bar and at an acute angle to the plane of the block 74 and is ground at opposite longitudinal sides thereof to define an obliquely extending rib 158, which rib is extended closely between the parallel sides of the notch 80 in the cutter block.

Since the pin 156 is extended at an acute angle to the plane of the block, endwise adjustment of the pin through the medium of set screws 160 or other suitable means, will bring about an extremely fine and sensitive adjustment of the block. That is to say, a predetermined endwise movement or adjustment of the locating pin 156 will result in a greatly reduced adjustment of the cutter block, this being true because of the acute angle at which the locating pin 156 is placed, with respect to the cutter block and the angle of the rib 158 with respect to the locating pin itself.

The thrust member 154 disclosed in Figure 24 is provided at opposite end portions thereof with suitably tapered sockets adapted for the reception of tapered expansion elements 236, the inner portions of which are formed with shanks threaded into the thrust member and forming a simple means by which the expansion members are secured in the desired positions with respect to the thrust member.

Figure 24 clearly illustrates that the thrust member is provided with longitudinal incisions intersecting the sockets in the thrust member and opening out through the ends and opposite sides of the thrust member to define partly severed and thus yieldable portions which may be urged by the expansion elements 236 into the desired contact with the rear wall of the cutter block 74 and the rear wall of the slot 152. This arrangement provides for the regulated expansion of the thrust member 154 to take up lost motion between the parts within the slot 152 and to compensate for the wear that occurs over a long period of service. By rendering the thrust member 154 expansible it is possible to take up looseness in the slot 154 and it is also possible to provide exactly the desired amount of float on the part of the block 74. More specifically, the end portions of the thrust member 154 are shown to be expansive under the influence of the elements 236 so that the end portions of the thrust member may be independently expanded to true up the block in the slot of the bar.

Figures 27, 28 and 29 disclose another means of effecting a materially diminished movement or adjustment of the cutter block in response to endwise adjustment of the locating pin and in these figures, the bar 170 is formed with a diametrical slot receiving the cutter block 74 or its equivalent and a thrust-receiving member 172.

Figure 28 illustrates that the cutter block 74 is held in a predetermined adjusted position by a locating pin 176 originally straight and plain for the full length thereof and having opposite sides thereof ground away to provide opposite parallel block-engaging faces adapted for flat contact with the parallel side walls of the recess 80.

Figure 28 also illustrates that the locating pin 176 is extending at an acute angle to the plane of the block to dispose the block contacting faces thereof at right angles to the plane of the block to the end that endwise adjustment of the locating pin through proper adjustment of the set screws 178 will bring about a materially diminished movement on the part of the cutter block. This arrangement involves what might be said to be a differential action, looking to the extremely sensitive adjustment of the cutter block with respect to the bar 170 or other carrier.

The foregoing illustrates that a rotary cutter constructed in accordance with this invention is capable of a wide variety of mechanical expressions and therefore it is to be understood that the forms of invention herewith shown and described are to be taken merely as preferred examples of the various aspects of the same, and that such minor changes in arrangement and constructions of parts may be made as will remain within the spirit of the invention and the scope of what is claimed.

Having thus described my invention, what I claim is:

1. In a boring tool, a support having a slot provided with a rear wall, a cutter block in the slot, a thrust transmitting member between the block and the rear wall of the slot and provided with a recess having inclined walls, and a spring pressed detent carried by said support and engaging one of the walls of said recess to urge the thrust member in the direction of said rear wall of the slot.

2. In a boring tool, a support having a transverse slot, a cutter block in said slot and having one edge thereof formed with a groove diminished in depth toward one end thereof, a thrust transmitting member between said block and the rear wall of the slot having a tapered rib received in said groove, and spring means engaged with said thrust member and urging the same endwise.

3. In a boring tool, a support having a slot, a cutter block in the slot, a locating pin extending at right angles to the axis of the support and at an acute angle to the longitudinal plane of the block and being provided with a diagonal block-engaging rib at substantially right angles to the plane of the block, and means to adjust said pin endwise to effect a diminished adjustment of the block.

4. In a boring tool, a support having a transverse slot, a block in the slot, a locating pin substantially at right angles to the axis of the support and at an acute angle to the plane of the block and being provided with a rib substantially at right angles to the longitudinal plane of the block and having motion transmitting contact therewith, and means engaging said pin to adjust the same endwise and thereby effect a reduced movement of said block.

5. In a boring tool, a support having a transverse slot, a cutting block in the slot, a locating pin carried by the support at an acute angle to the plane of the cutting block and being provided with an intermediate portion substantially at right angles to the longitudinal plane of said cutter block and defining block-engaging surfaces, and means to adjust the pin endwise.

6. In a boring and reaming bar, a body having a transverse slot opening out through opposite sides thereof, a cutter block in the slot and having an axial dimension less than that of the slot, a locating member intersecting the forward portion of the slot and the block and having means selectively holding the block rigidly or floatingly in place, and a thrust member between the block and the rear wall of the slot wholly at the rear of the block to hold the block in intersecting relation with the locating member, said thrust member being in non-interlocking relation with the block thereby allowing floating action of the block in the slot while the thrust member is in place, and a retainer holding the thrust member against movement during floating action of the block.

7. In a boring bar, a body having a transverse slot opening out through opposite sides thereof, a cutter block in the slot and having an axial dimension less than that of the slot, a locating member intersecting the forward portion of the slot and the block and having means selectively holding the block rigidly or floatingly in place, and a removable thrust member between the block and the rear wall of the slot in non-intersecting relation with the block allowing floating action of the block in the slot while the thrust member is in place, said thrust member being removable from said block receiving slot in the body.

8. In a boring and reaming bar, a body having a transverse slot opening out through opposite sides thereof, a cutter block in the slot, a locating member intersecting the forward portion of the slot and the block and having means selectively holding the block rigidly or floatingly in place, and a removable thrust member between the block and the rear wall of the slot in line with the longitudinal plane of the block to hold the block in intersecting relation with the locating member, said thrust member being in non-interlocking relation with the block allowing floating action of the block in the slot while the thrust member is in place.

9. In a boring and reaming bar, a body having a transverse slot opening out through opposite sides thereof, a cutter block in the slot, a locating member having means selectively holding the block rigidly or floatingly in place, and a removable thrust member between the block and the rear wall of the slot in line with the longitudinal plane of the block, said thrust member being provided with end portions individually and selectively expansible and means for individually and selectively expanding said expansible end portions for trueing the block in the slot.

10. In a reaming and boring bar, a body having a slot, a cutter block in the slot, said body being provided with a transverse opening at an acute angle to the longitudinal plane of said slot, a locating member movable endwise in said opening and having a body portion extending diagonally at a point between the ends thereof and in interlocking relation with said block, and means to move said locating member endwise.

11. In a boring tool, a support having a slot provided with a rear wall, a cutter block in the slot, a spring pressed detent carried by said support and projecting into said slot, and a thrust transmitting member engaged by the detent between said block and the rear wall of the slot and having a recess formed with walls inclined with respect to the line of thrust of said spring pressed detent, one of said walls of the recess being in the line of major thrust of said spring pressed detent and the other wall being spaced from said line of major thrust.

12. In a boring tool, a support having a transverse slot, a cutter block in said slot and having one edge thereof formed with a groove diminished in depth toward one end thereof, a thrust transmitting member between said block and the rear wall of the slot and having a rib received in said groove, and a spring pressed retainer engaging said thrust member and urging the thrust member into firmly interlocking relation with said block.

13. In a boring tool, a support having a slot, a cutter block in the slot, said support having an opening intersecting said slot at an acute angle to the sides thereof, an endwise movable locating member in said opening and provided with a diagonal block-engaging rib at substantially right angles to the plane of the block, and means to adjust said locating member endwise to effect movement of the block.

14. In a boring bar of the type in which an adjustable cutter block is detachably mounted, a substantially cylindrical support having a cutter block receiving slot provided with approximately parallel forward and rear end walls, an adjustable rectangular cutter block in said slot and having front and rear end walls approximately parallel to each other, a locating element in the forward portion of the slot and having block adjusting interlocking engagement with said cutter block at a point spaced inward of the periphery of the support, means for shifting the locating element for adjusting the block transversely in the slot, the front end of the adjustable cutter block being flatly in engagement with the forward wall of the slot, the rear wall of said cutter block being approximately parallel to the rear wall of the slot and spaced in advance thereof leaving a space of substantially uniform cross-sectional area throughout between the approximately parallel rear walls of the block and the slot for the axial retraction of the adjustable cutter block out of interlocking engagement with the said locating element, and a thrust member detachably engaging the opposed rear end walls of the cutter block and the slot and being removable endwise through the block receiving slot to create the said space for the axial retraction and subsequent removal of the cutter block.

15. In a boring bar of the type in which an adjustable cutter block is detachably mounted, a substantially cylindrical support having a cutter block receiving slot provided with approximately parallel forward and rear end walls, an adjustable rectangular cutter block in said slot and having front and rear end walls approximately parallel to each other, a locating element in the forward portion of the slot and having interlocking engagment with said cutter block at a point spaced inward of the periphery of the support, the front end wall of the adjustable cutter block being flatly in engagement with the forward wall of the slot, the rear wall of said cutter block being approximately parallel to the rear wall of the slot and spaced in advance thereof leaving a space of substantially uniform cross-sectional area throughout between the parallel rear walls of the block and the slot for the axial retraction of the adjustable cutter block out of interlocking engagement with the said locating element, and a thrust member detachably engaging the opposed rear end walls of the cutter block and the slot and being removable endwise through the block receiving slot to create the said space for the axial retraction and subsequent removal of the cutter block, said thrust member having slotted end portions and means within the slotted end portions for expanding the same into locking engagement with the opposed walls of the block and the slot.

16. In a boring bar of the type in which a blade carrying block is detachably mounted, a substantially cylindrical support having a cutter block receiving slot provided with approximately parallel forward and rear end walls, a blade carrying block of rectangular form in said slot and having a forward wall engaging the forward wall of the slot and having a rear wall approximately parallel to the forward wall of the block and to the said rear end wall of the slot, a locating element carried by a support and projecting into said slot for interlocking and block positioning engagement with the forward wall of said cutter block, means associated with said locating element and carried by the support for adjusting the locating element and thus changing the position of the block, said block having an axial dimension substantially less than that of said cutter block receiving slot leaving a space between the rear walls of the block and slot of substantially uniform cross-sectional area throughout for the axial retraction of the cutter block out of interlocking relation with said locating element and a thrust member detachably engaging the said rear wall of the block and the rear wall of the slot and being removable through either end of the slot to create said space for the axial retraction and subsequent removal of the cutter block.

17. In a boring bar of the type in which a blade carrying block is detachably mounted, a substantially cylindrical support having a cutter block receiving slot provided with approximately parallel forward and rear end walls, a blade carrying block of rectangular form in said slot and having a forward wall engaging the forward wall of the slot and having a rear wall approximately parallel to the forward wall of the block and to the said rear end wall of the slot, a locating element carried by a support and projecting into said slot for interlocking engagement with the forward wall of said cutter block, means associated with said locating element and carried by the support for adjusting the locating element and thus changing the position of the block, said block having an axial dimension substantially less than that of said cutter block receiving slot leaving a space between the rear walls of the block and slot of substantially uniform cross-sectional area throughout for the axial retraction of the cutter block out of interlocking relation with said locating element, and a thrust member in said slot in detachable engagement with the said rear wall of the block and the rear wall of the slot and being removable through either end of the slot to create said space for the axial retraction and subsequent removal of the cutter block, said thrust member having expanding means contained therein and accessible from one end thereof for expanding the thrust member into contact with the rear walls of the block and the slot.

FRANK P. MILLER.